(12) United States Patent
Aleksic et al.

(10) Patent No.: US 6,643,756 B1
(45) Date of Patent: Nov. 4, 2003

(54) SYSTEM AND METHOD FOR ACCESSING VIDEO DATA USING A TRANSLATION CLIENT

(75) Inventors: Milivoje Aleksic, Richmond Hill (CA); Nader Akhlaghi-Tavasoli, Thornhill (CA); Jason Chan, Richmond Hill (CA); Carl Mizuyabu, Thornhill (CA); Antonio Asaro, Scarborough (CA)

(73) Assignee: ATI International Srl, Christchurch (BG)

( * ) Notice: Subject to any disclaimer, the term of this patent is extended or adjusted under 35 U.S.C. 154(b) by 0 days.

(21) Appl. No.: 09/438,308

(22) Filed: Nov. 11, 1999

(51) Int. Cl.[7] ............................................. G06F 12/00
(52) U.S. Cl. .................. 711/202; 711/206; 711/207; 710/126; 710/127; 710/128; 710/129; 345/568; 345/533
(58) Field of Search .................. 711/202, 206–207; 710/126–129; 345/568, 533

(56) References Cited

U.S. PATENT DOCUMENTS

| | | | | |
|---|---|---|---|---|
| 5,911,051 A | * | 6/1999 | Carson et al. | 710/107 |
| 5,999,198 A | * | 12/1999 | Horan et al. | 345/521 |
| 6,069,638 A | * | 5/2000 | Porterfield | 345/516 |
| 6,346,946 B1 | * | 2/2002 | Jeddeloh | 345/503 |

* cited by examiner

Primary Examiner—Donald Sparks
Assistant Examiner—Mehdi Namazi
(74) Attorney, Agent, or Firm—Vedder, Price, Kaufman & Kammholz, P.C.

(57) ABSTRACT

A request for video or graphics data is made to a memory controller. When the memory controller determines a translation of the data must first be made, a request is made to a translator. The translator either translates the address or requests translation information from the memory controller. The memory controller accesses memory based upon the translator request. If the request is for translation data the results are tagged for the translator. If the translator request is for the translated address, the results are tagged for the original request.

9 Claims, 5 Drawing Sheets

SYSTEM AND METHOD FOR ACCESSING VIDEO DATA USING A TRANSLATION CLIENT

FIELD OF THE INVENTION

The present invention relates generally to accessing data in computer systems, and more specifically a system and method for accessing video and system data from a unified memory using an address translator.

BACKGROUND OF THE INVENTION

FIG. 1 illustrates a prior art computer system utilizing an Accelerated Graphics Port (AGP) bus, which provides access to high speed video memory used to support video processing.

As illustrated in prior art FIG. 1, the computer system comprises a central processing unit (CPU), a memory controller, system memory, an AGP interface controller (AIC), and video memory.

In operation, the CPU will make a request for a memory resource either in the video space, or the system memory. The memory controller receives the request from the CPU and when the requested data is in the system memory, will access the requested data directly, and when the requested data is in the video memory, will provide a request via its AGP port to the AGP bus. An AGP port associated with the AIC controller receives the request and will access the request of data in the video memory.

When data is requested from the video memory, the requested address must be translated into the appropriate video memory space. If the address containing the requested information is not currently translated in a cache associated with the AIC, the AIC must first request updated translation information from the video memory. Once the requested translation data has been obtained from the video memory, the AIC controller can translate the address received from the memory controller, and make a second request to the video memory for the actual data. Upon receiving the actual data, the data is provided to the memory controller through the AGP bus. The memory controller further routes the data as appropriate.

In order to utilize the AGP bus of the prior art, it is necessary to provide the hardware and software overhead necessary to implement AGP ports on both the memory controller and the AIC controller to support the protocol. In addition, the prior art systems isolate the video memory from the system memory. As a result, increased costs are incurred to support the AGP protocols associated with the interfaces of the two controllers, as well as the requirement for maintaining a separate system in video memory. Therefore, a system and method capable of overcoming these prior art disadvantages would be desirable.

DETAILED DESCRIPTION OF THE DRAWINGS

In accordance with the present invention, a request for video or graphics data is made to a memory controller. It is determined by the memory controller that the specific video graphics request will require a translation of the address before the actual data can be retrieved. The memory controller provides the necessary information to an AGP-type interface controller interface circuit. (AIC_IC). The AIC_IC provides a request to an AGP GART (Graphics Address Remapping Table) to make the appropriate translation and subsequently provide the data. The AGP GART will translate the address associated with the request directly if it resides within a local cache. If the address of the requested data does not reside within the local cache, the proper translation must first be determined.

The proper translation is determined by providing a data request to the memory controller for data from memory that contains the actual translation needed. This request is made from the AGP GART to the memory controller. The memory controller will recognize that the request is not a video request and will service the request by accessing the data directly from memory. The requested data is provided to the AGP GART. The AGP GART will store the newly received translation information in its local cache, translate the address of the original request using the newly retrieved data, and submit a request for data to the memory controller 210. The request for the actual data from the memory controller 210 will include an indicator that the request is actually for the original requesting client, and not for the GART. In response to the data being retrieved, the requested data is accessed and provided to the original requested client.

Figure 1:
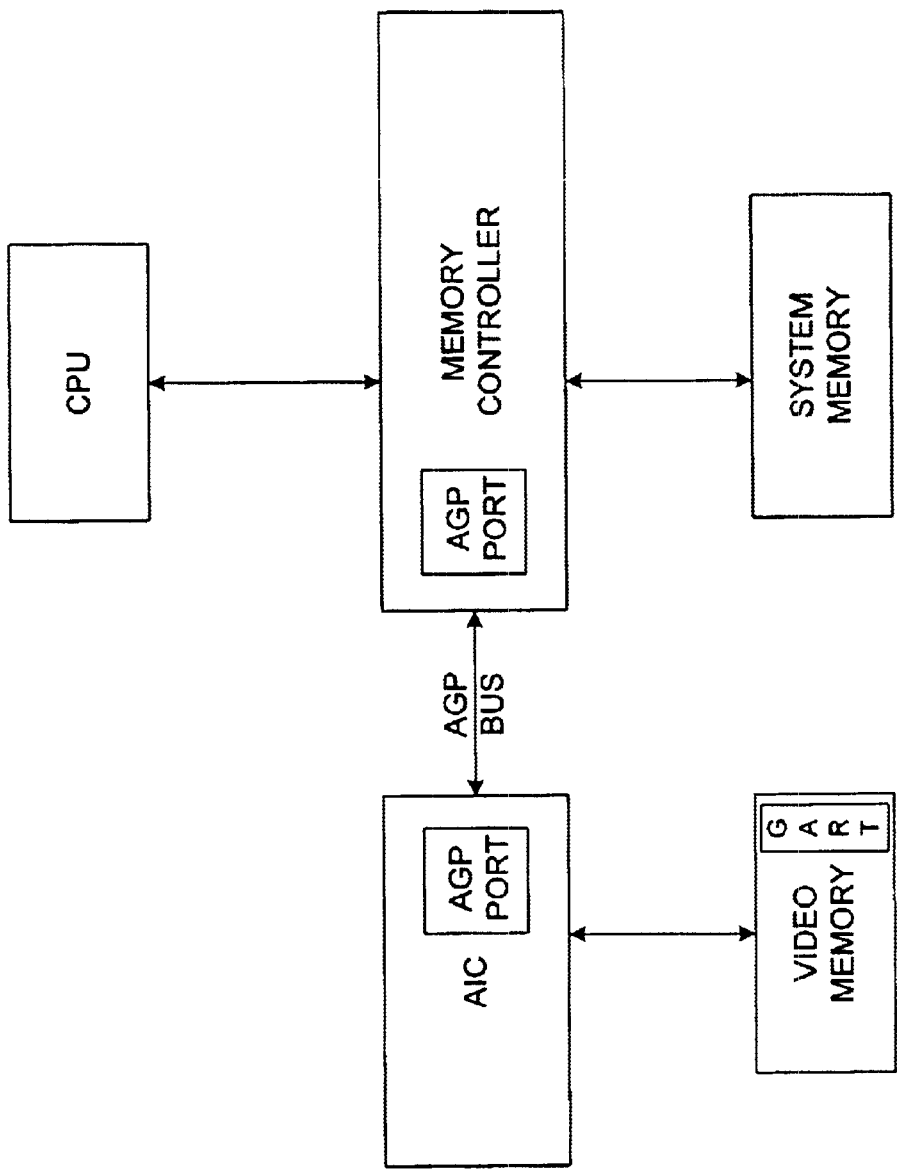
FIG. 1 illustrates, in block diagram form, a system utilizing an AGP bus in accordance with the prior art.
Figure 2:
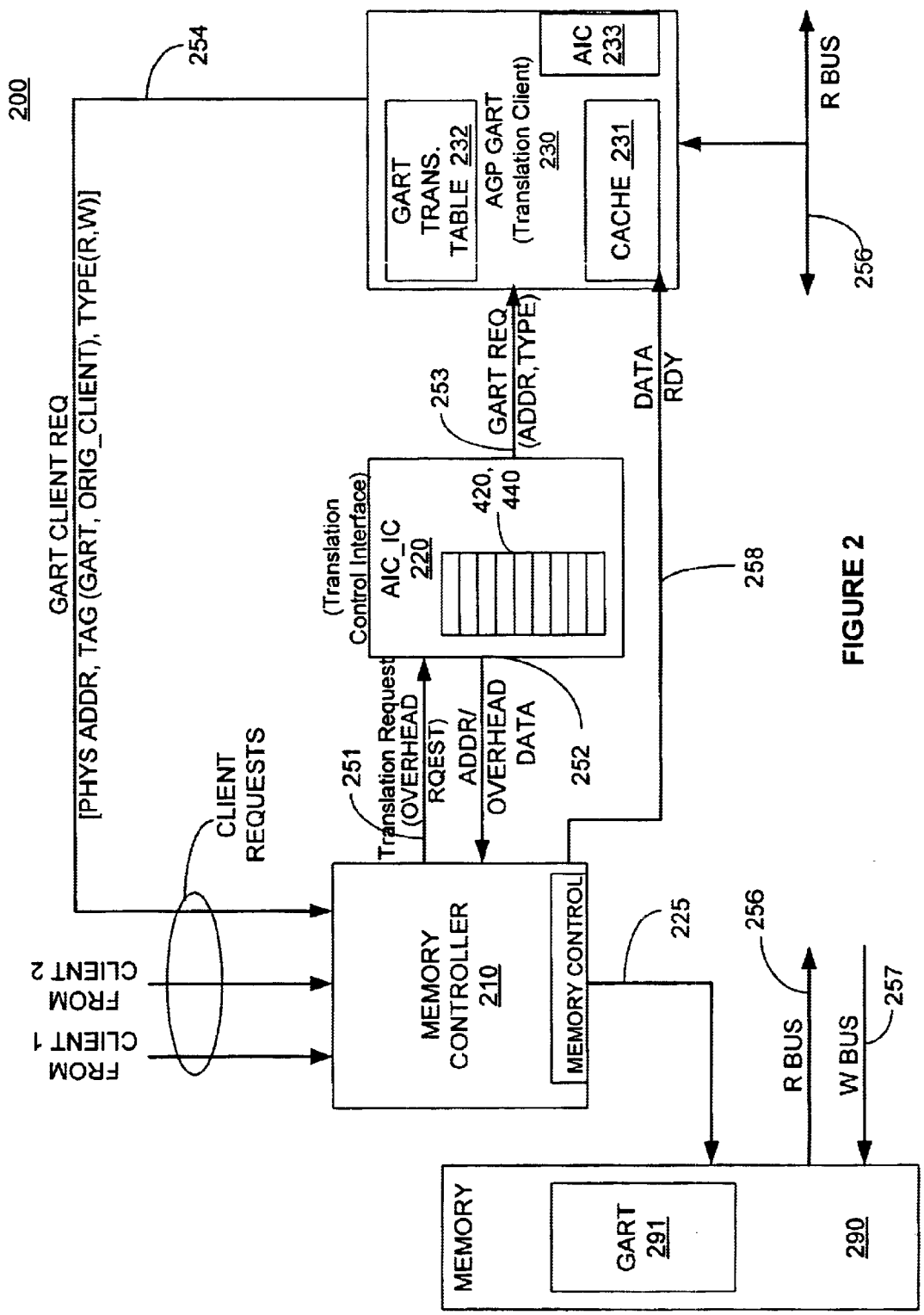
FIG. 2 illustrates, in block diagram form, a system for translating graphics requests in accordance with the present invention.

The present invention is best understood with reference to FIGS. 2–5. FIG. 2 represents a system portion 200 comprising a memory controller 210, an AIC_IC controller 220, an AGP GART 230, a memory 290, a read bus 256, and a write bus 257.

The memory controller 210 receives a plurality of client requests. Requests from three clients are illustrated in FIG. 2. The requesting clients are labeled CLIENT1, CLIENT2, and AGP GART 230. In a specific embodiment, each of the requesting clients will fall into one of three categories. First are read clients which request data to be retrieved from memory and provided to the client. The second client type is a write client which requests data provided to the memory controller be stored. The third client is a GART client, which can either request a read or a write depending on its current operation.

Upon receiving a specific client request, the memory controller 210 will determine whether the requested memory is capable of being accessed directly, or whether the address provided by the client needs translation. When a translation needs to occur, the memory controller will make a translation request referred to as a GART request. Note that while the term GART may have specialized meaning elsewhere, herein it is used to refer to the generic translation that occurs by using a graphic address Remapping Table. Likewise, the terms AIC_IC and AGP GART, which may have specialized meanings elsewhere, are used herein to generically describe those functions to which they are assigned herein.

When the memory controller determines the client request is a GART request, the logical address location and overhead data associated with the request are provided to the AIC_IC.

The overhead data will include data such as a mask associated with the data to be accessed, a client identifier that identifies the requesting client, and a tag provided by the requesting client that identifies a specific request to the client. The AIC_IC 220 strips off and saves the overhead data for further use, and provides a GART request which includes the logical address location provided by the client and the type of request, read or write. The AGP GART 230 receives the logical address location and determines whether or not a translation from the. logical address to a physical address presently resides within the cache 231. When the translation for the logical address is present in the cache 231, the AGP GART 230 performs the translation by providing a GART client request that includes the physical address, and a TAG to the memory controller 210.

Upon recognizing the GART client request, the memory controller 210 will recognize based upon the TAG that the request is to satisfy the original requesting client's data requested. As a result, the memory controller 210 will provide an overhead request to AIC_IC 220, which provides the saved overhead data to the memory controller 210 to allow the memory controller 210 to access proper amount of data from the memory 290, and to provide proper routing information to assure the data is accessed by the requesting client. The data associated with the request is either provided directly to the write bus by the client or from a buffer which received the data at the time of the client request, or provided to the read bus from the Memory 290. Appropriate control logic is generated through the retrieved overhead data in order to assure the originating client that the request has been completed.

When the logical address received at the AGP GART 230 does not reside within the cache 231, the translation tables stored in the cache 231 need to be updated. The updated information is requested in the form of a client request to the memory controller 210. The specific address of the client request will access information stored in the GART translation tables 232. The information requested from, the GART translation tables 232 will contain translation data mapping the logical address of the video request to a physical address. The GART client request will include a TAG indicating that the GART client request is for the GART. The memory controller 210, upon recognizing the GART client request, will access the memory 290, retrieve the translation data from the GART table 291, provide it to the read bus, and assert the appropriate control signals to notify the AGP GART that the data on the read bus 256 is the requested translation data.

The AGP GART 230, upon receiving notification that the data on the read bus 256 is the GART request, will retrieve the translation data and update the cache 231. Having received the updated translation information, the AGP GART 230 will translate the logical address of the original request to a physical address, place the physical address and a tag indicating the original client data is being serviced on the GART client request bus 254, and request the data from the memory controller 210 for the original requesting client.

In response to the GART client request, the memory controller will provide a request to the AIC_IC 220 for the overhead data associated with the original client request. Based upon the translated physical address, and the retrieved overhead data, the memory controller 210 will access the data in memory 290. Where the original request was a read request, the requested data will be placed on the read bus 256, and the original client notified that the data is present for retrieval upon the read bus 256.

By treating the AGP GART 230 as a client, a single memory controller 210 can be implemented to access a single unified memory 290. This is advantageous, in that it reduces the system cost by eliminating the need for the full implementation of prior art GART port. In addition, because the specific implementation outlined herein can be implemented on a single chip implementation, the need to maintain strict AGP protocols as defined in the prior art is not necessary. For example, the GART request between the AIC_IC 220 and the AGP GART 230 it needs only to provide the logical address and not the overhead information. Likewise, the AGP GART 230 client request to the memory controller 210 need only provide the physical address and tag information, indicating whether or not it is a GART request or a request to satisfy an original client.

Not having to maintain a strict AGP bus protocol is advantageous in that it allows for fewer signals to be routed between the various functional portions of the system. Yet another advantage of the present invention is that the AGP GART spends less time processing each request than in the prior art, because once the AGP GART 230 provides a GART client request using the translated physical address to the bus 254, the AGP GART 230 has completed its translation and data retrieval work, because the memory controller 210 completes the retrieval of the originally requested data for the requesting client. This will free up the AGP GART 230 to begin processing a next request. Specific implementations of systems that utilize a unified memory are described in patent applications Ser. Nos. 09/347,201 and 09/347,202, which are hereby incorporated by reference.

Figure 3:
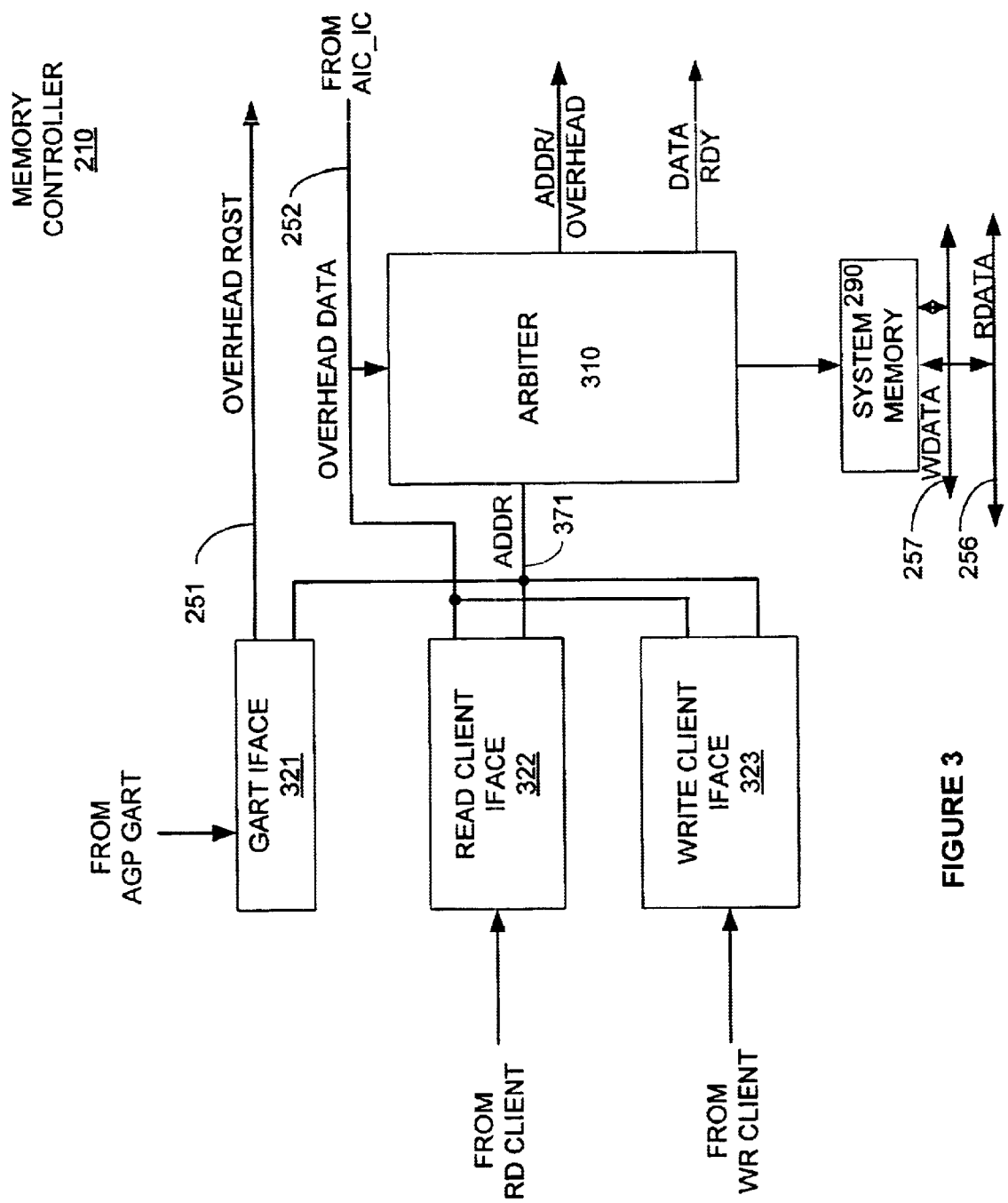
FIG. 3 illustrates in block diagram form, a detailed view of the memory controller of FIG. 2.
Figure 4:
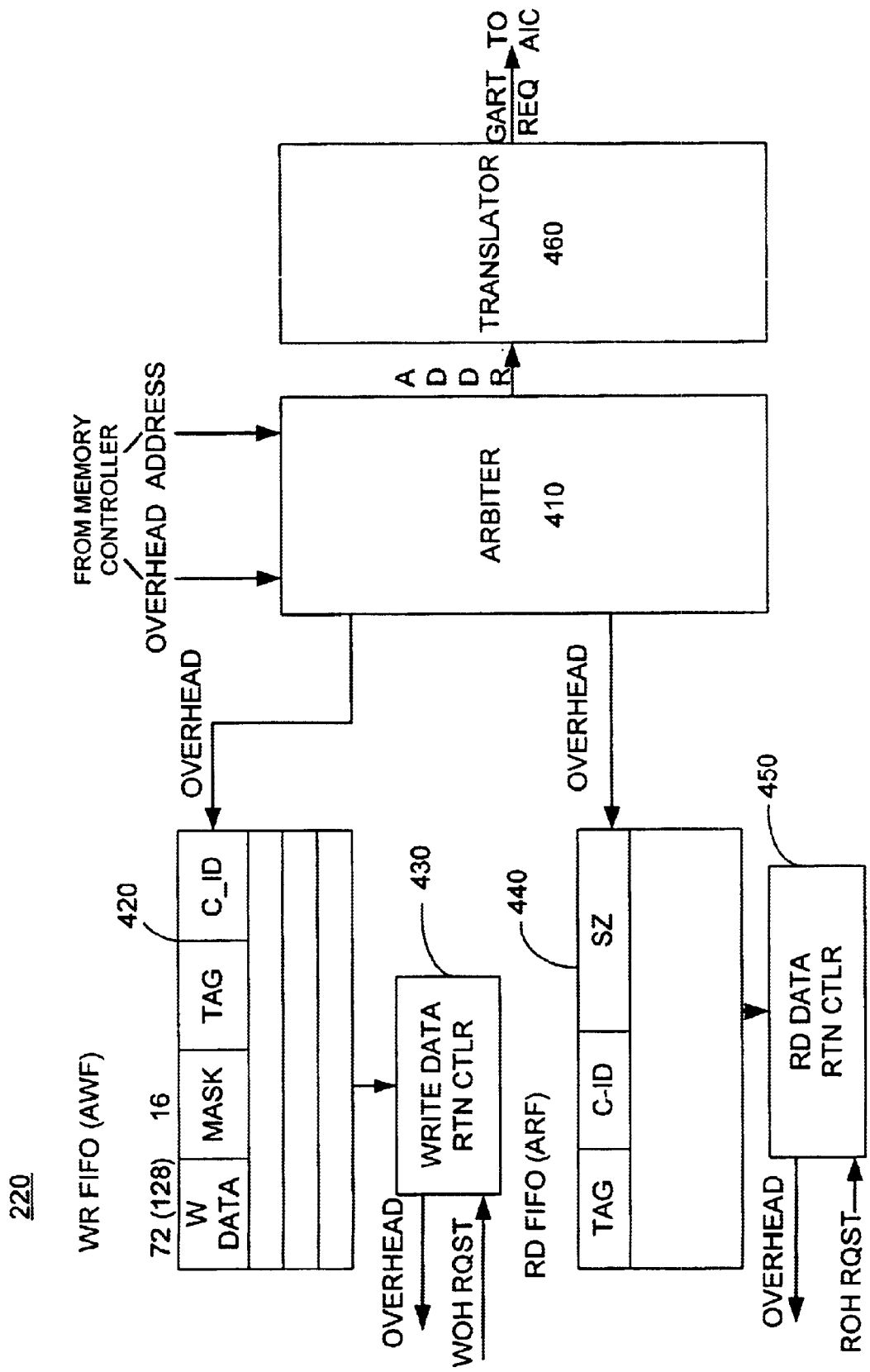
FIG. 4 illustrates, in block diagram form, a detailed view of the AIC interface controller of FIG. 2.
Figure 5:
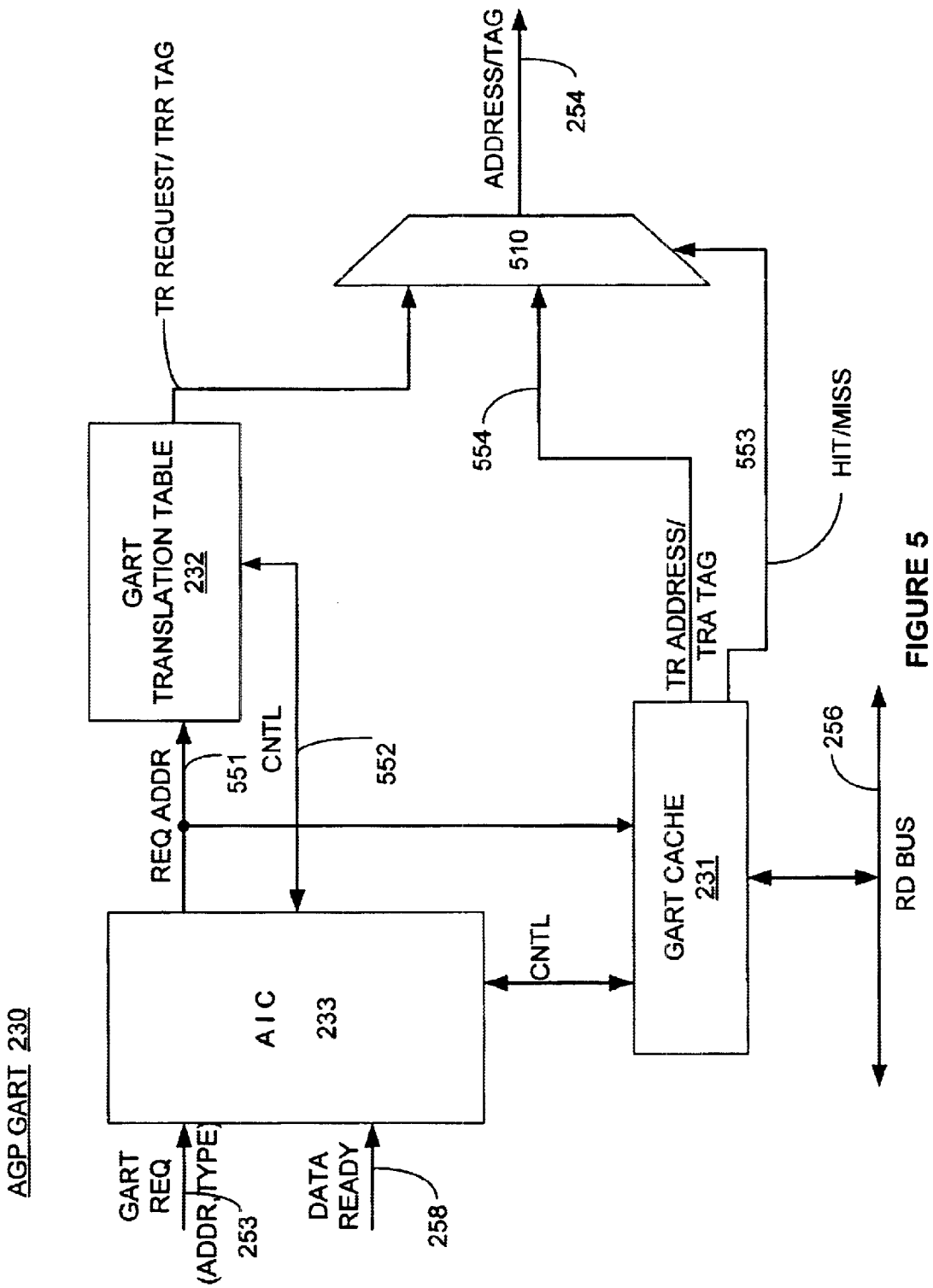
FIG. 5 illustrates, in block diagram form, a detailed view of the AGP GART of FIG. 2.

FIGS. 3 through 5 illustrate specific portions of the system 200 in accordance with the present invention. FIG. 3 illustrates in greater detail the memory controller 210. The specific embodiment illustrated includes a GART interface portion 321, a read client interface portion 322, a write client interface portion 323, an arbiter portion 310, and the system memory 290 coupled to the read data bus 256, and the write data bus 257.

In a specific embodiment, each client request is received by a separate interface portion. For purposes of illustration, the read client request can be from CLIENT1 of FIG. 2, while the write client request can be from CLIENT2 of FIG. 2. As illustrated, the write client request is received at write client interface 323, the read client request is received at the read client interface 322, and the GART client request is received at the GART interface 321.

In the specific embodiment illustrated, each client interface will receive a request from a single client. The interfaces can perform several functions, including a FIFO function in order to queue a number of requests from a specific client, and performing an address decoding as appropriate. In addition, each client interface provides an output to the arbiter 310 directly, and a read client interface receives an input. from the AIC_IC controller to receive overhead data associated with client requests that have undergone a translation request.

The GART interface 321 provides a TAG to specify one of two types of requests. One request type is a GART request, whereby the provided address indicates an address location containing data to be used to perform a translation by the AGP GART 230. The second type of access request is a read or write client request from the AGP GART 230 where the provided address is where data is to be retrieved from or stored to in order to satisfy a client request that has been translated.

Where the GART client TAG indicates a request is for a translation data, the GART interface 321 will provide the request to the arbiter 310. The arbiter 310 will recognize the GART interface request and allow access to the system memory 290 in order to provide the translation data onto the read bus 256. When the data has been provided to the read bus 256, the memory controller will provide an asserted signal onto the data ready bus 258, which is monitored by the AGP GART 230 to determine when translated data is available on the read bus 256.

When the GART request to the GART interface 321 is for data access requested by a read or a write client, the GART interface 321 will not only provide the request to the arbiter 310, but also an overhead request on node 251 to AIC_IC 220. The overhead request on node 251 is received by the AIC_IC 220, which in response will provide the saved overhead data on nodes 252 to the arbiter 310. The arbiter 310 uses the overhead data to complete the system memory 290 access. Once the overhead data is received, the arbiter completes the originating client's requests by accessing the memory 290 and routing data to or from the originating client.

FIG. 4 illustrates the AIC_IC 220 of FIG. 2 in greater detail. One function of the AIC_IC controller is to strip off the overhead data associated with client requests. When a write request is received by the AIC_IC 220, the overhead data to be stored in the FIFO 420 includes the write data, the mask associated with the write data, a client I.D. identifying the requesting client, and a tag provided by the requesting client that identifies the specific request.

When the requesting client is a read client, the request is stored in the read FIFO 440 of FIG. 4 whereby the client I.D., tag, and size of the read request is stored.

The data stored in the read FIFO 440, and the write FIFO 420, is information that is not needed by the GART 230. By storing the overhead data in the FIFO close to the memory controller, it is not necessary to route additional signal lengths over buses 253 and 254 in order to maintain the integrity of the requests. The integrity of the request is maintained using the read/write type indicator of the request from the GART CLIENT. Because the order in which the requests are processed by the AIC_IC 220, and the type of request from the AGP GART 230 is known, the appropriate overhead information can be returned to the memory controller 210 at an appropriate time.

After the arbiter 410 has stripped off the overhead data and routed it to one of the read FIFO or the write FIFO, the address portion is passed to the translator 460. This logical address passed to the translator 460 is further processed as appropriate in order to pass the information to the AGP GART 230 in the form of a GART request.

FIG. 5 illustrates in greater detail the AGP GART 230 of FIG. 2. FIG. 5 illustrates an AGP interface controller 233, a GART translation table 232, a GART cache 231, and a multiplexor 510.

In operation, the GART request from the AIC_IC 220, and the data ready signal from the memory controller 210 are received by the AIC 233. The AIC 233 acts as a client request controller, in that the AIC 233 ultimately controls the address and tag information provided to the GART client request associated with the bus 254. The AIC 233 provides the control and address information to the GART cache 231 and the GART translation table 232.

The cache 231 operates as a translation cache in that if the logical address is represented in the GART cache 231, a translated physical address will be provided to one of the inputs of the multiplexor 510. In addition to providing a translated address, the GART cache 231 causes a HIT signal to be asserted when the translation is successful, which is used to control the select signal of the multiplexor 510. In addition, the GART cache 231 causes a TAG to be generated based upon the state of the HIT signal. The TAG indicates if the provided address is for translation data to be stored in the CACHE 231, or a translated address for an original client request.

Based upon the control and address information provided to the GART translation table 232, an address corresponding to the GART TABLE 291 of FIG. 2 will be provided. This address contains the translation information for the currently requested logical address, and is provided to the other input of the multiplexor 510. Depending upon the state of the hit and miss indicator from the GART cache 231, either the translation request will be provided to memory controller 210, or the translated physical address will be provided to the memory controller 210.

When the memory controller 210 accesses translation information, it is placed upon the read bus 256 and the data ready signal is asserted indicating to the GART cache 231 to retrieve the data from the read bus 256 and update the cache values. Once the cache values have been updated, it is possible for the original logical address to be translated to a physical address and provided to the multiplexor 510 resulting in an asserted HIT indicator.

Referring to FIG. 2, the address/overhead data which is provided to bus 252 includes the logical address of the client request, the client identifier, and overhead information. The overhead information includes for both read and write clients tag information which indicates to the client where the data is to be used, a swap indicator indicating whether big endian, or little endian data is being used, as well as control signals RTR (ready to receive), and RTS (ready to send) indicators.

When the requesting client is a read client, the size indicator identifies the number of words or bytes to be retrieved is indicated. For a write client, in one embodiment, data to be stored is provided as part of the overhead from the requesting client. In another embodiment, the client can indicate how much data is to be provided, and wait for the memory controller to access the bus before providing the data. In addition, it should be understood that other miscellaneous overhead signals can be provided. For example, indicators as to whether or not bytes, words, double words, are going to be sent, as well as status indicators indicating a current status of the memory controller can be transmitted. For example a memory controller status can indicate whether or not the memory controller is currently accessing data on the system bus or the AGP bus.

Also referring to FIG. 2, the memory controller 210 includes a memory control port which is coupled to the bus 225 which provides address and control signals necessary to access data from the memory 290.

For clarification, the term access generically refers to both reads and writes to a memory location. For purposes of discussion, unless explicitly indicated otherwise, when access to memory is referred to as receiving data, it will generally also correspond to writes of data to memory.

It should be understood that the present invention has been illustrated in terms of a specific embodiment. As such, many variations to the specific implementations can be recognized by one of ordinary skill in the art. For example, the actual hit or miss indicator associated with GART cache 231 of FIG. 5 can be provided by the AIC 233. As a further example, the memory 290 has been described as a unified cache. In other embodiments, the memory 290 can include multi channels of memory however both being under the control of the memory controller 210.

The present invention is advantageous in that it provides the ability to utilize a single memory controller to access video and system data in a unified cache environment. As a result, the protocols needed to support translations, thereby reduce the cost of supporting the protocols, can be reduced.

We claim:

1. A system comprising:
 a plurality of memory clients each having an output, one of the plurality of memory clients being a translation client having an input;
 a first memory controller having
  a plurality of inputs, a memory control port, and an address translation request output,
  each one of the plurality of inputs coupled to the output of one of the plurality of memory clients;
  the address translation request output coupled to the input of the translation client;
  a translation control interface having a storage location to store identification information received from the memory controller, said translation control interface being operatively coupled between said address translation request output and the input of the translation client;
 a memory coupled to the memory control port; and
 wherein the translation client requests from the memory controller, access to address translation mapping information stored in the memory.

2. The system of claim 1 wherein the translation client includes:
 a client request controller to provide requests to the output of the translation client.

3. The system of claim 1 wherein the translation client includes:
 a translation cache.

4. The system of claim 1, wherein the memory controller, in response to a request from the translation client, retrieves translation data from a GART table in the memory.

5. The system of claim 1, further including:
 a client request controller.

6. The system of claim 1, wherein at least one of the plurality of memory clients includes
 a read client.

7. The system of claim 6, wherein at least one of the plurality of memory clients includes
 a write client.

8. A system comprising:
 a read client having an output to request receiving data from a first memory;
 a write client having an output to request sending data to the first memory;
 a translation request client having an output
  to request receiving data from the memory when in a first mode of operation, and
  to request sending data to the memory when in a second mode of operation;
 a second memory to store data associated with the read client the write client, and the translation request client; and
 a memory controller having a first input coupled to the output of the read client, a second input coupled to the output of the write client, a third input coupled to the output of the translation request client, and an output coupled to an input of the first memory, wherein the output is coupled to an input of the translation request client.

9. The system of claim 8, wherein the data of the first mode of operation is used to identify where the data of the second mode of operation is to be stored.

* * * * *